US00RE42433E

(19) United States
(12) Reissued Patent
Kweon et al.

(10) Patent Number: US RE42,433 E
(45) Date of Reissued Patent: Jun. 7, 2011

(54) POSITIVE ACTIVE MATERIAL FOR RECHARGEABLE LITHIUM BATTERY AND METHOD OF PREPARING SAME

(75) Inventors: Ho-Jin Kweon, Yongin-si (KR); Jung-Joon Park, Yongin-si (KR); Jeong-Soon Shin, Yongin-si (KR); Kyeong-Min Jeong, Yongin-si (KR)

(73) Assignee: Samsung SDI Co., Ltd., Yongin-si (KR)

(21) Appl. No.: 12/880,046

(22) Filed: Sep. 10, 2010

Related U.S. Patent Documents

Reissue of:
(64) Patent No.: 6,653,021
Issued: Nov. 25, 2003
Appl. No.: 09/792,425
Filed: Feb. 23, 2001

(30) Foreign Application Priority Data

Feb. 28, 2000 (KR) ..... 10-2000-0009829
Feb. 1, 2001 (KR) ..... 10-2001-0004897

(51) Int. Cl.
*H01M 4/48* (2010.01)

(52) U.S. Cl. ..... 429/231.1; 429/231.2; 429/231.3; 429/231.5; 429/231.6; 429/221; 429/223; 429/224; 427/58; 427/126.3

(58) Field of Classification Search ..... 429/231.1, 429/231.2, 231.3, 231.5, 231.6, 221, 223, 429/224; 427/58, 126.3
See application file for complete search history.

(56) References Cited

U.S. PATENT DOCUMENTS 6,372,385 B1 4/2002 Kweon et al.
6,783,890 B2 8/2004 Kweon et al.

FOREIGN PATENT DOCUMENTS

| | | | |
|---|---|---|---|
| EP | 1 035 600 | * | 9/2000 |
| EP | 1 035 600 A1 | * | 9/2000 |
| JP | 5-58605 | | 3/1993 |
| JP | 9-55210 | | 2/1997 |
| JP | 10-236826 | | 9/1998 |
| JP | 11-71114 | | 3/1999 |
| JP | 11-92119 | | 4/1999 |
| JP | 11-162466 | | 6/1999 |
| JP | 11-317230 | * | 11/1999 |
| KR | 10-0277796 | | 9/1999 |
| KR | 2001-0002785 | | 1/2001 |

* cited by examiner

*Primary Examiner* — Laura S Weiner
(74) *Attorney, Agent, or Firm* — Christie, Parker & Hale, LLP

(57) ABSTRACT

A positive active material for a rechargeable lithium battery is provided. The positive active material includes at least one compound selected from the group consisting of lithiated compounds, a metal oxide layer formed on a surface of the compound and metal oxide masses adhered on the metal oxide layer. The positive active material is produced by coating a compound with a metal alkoxide solution, an organic solution of a metal salt or an aqueous solution of a metal salt and heat-treating the coated compound. The compound is selected from the group consisting of lithiated compounds. Thereafter, the heat-treated compound is slow-cooled to 100 to 500° C. and the cooled compound is quenched to room temperature.

16 Claims, 4 Drawing Sheets

(Amended)

*FIG. 1* (Amended)
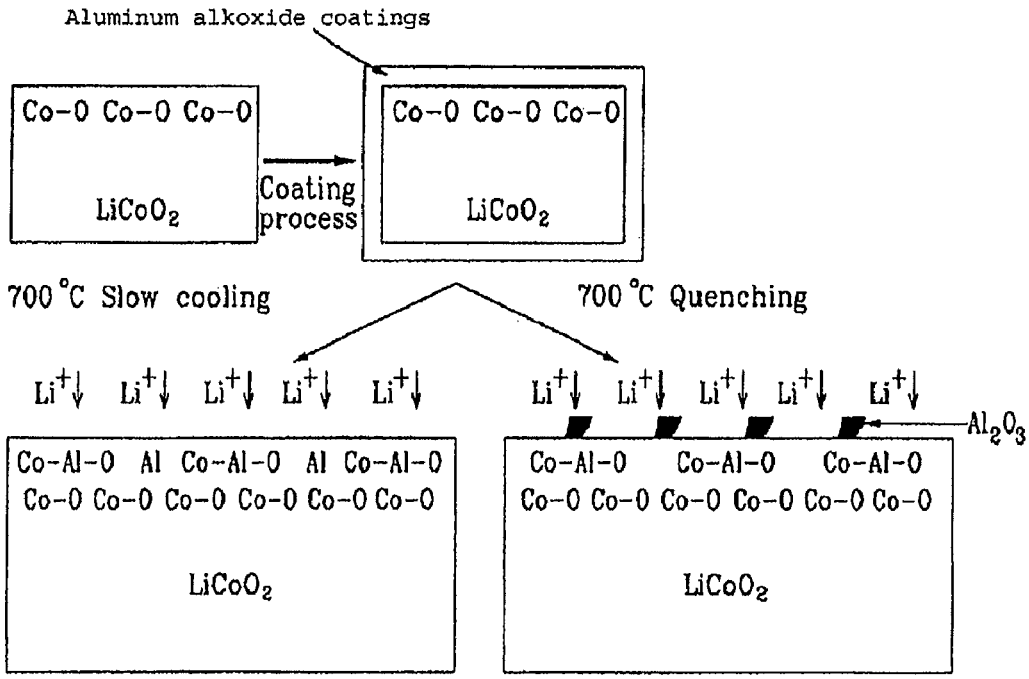

POSITIVE ACTIVE MATERIAL FOR RECHARGEABLE LITHIUM BATTERY AND METHOD OF PREPARING SAME

Matter enclosed in heavy brackets [ ] appears in the original patent but forms no part of this reissue specification; matter printed in italics indicates the additions made by reissue.

CROSS REFERENCE TO RELATED APPLICATION

This application [is based on application Ser.] *claims priority to and the benefit of Korean Patent Application* Nos. [00-9829] *10-2000-0009829* and [01-4897] *10-2001-0004897* filed in the Korean Industrial Property Office on Feb. 28, 2000 and Feb. 1, 2001, the [content of which is] *contents of which are* incorporated hereinto by reference.

BACKGROUND OF THE INVENTION (a) Field of the Invention

The present invention relates to a positive active material for a rechargeable lithium battery and a method of preparing the same, and more particularly, to a positive active material for a rechargeable lithium battery and a method of preparing the same in which the positive active material exhibits good electrochemical characteristics.

(b) Description of the Related Art

Rechargeable lithium batteries use a material from or into which lithium ions are deintercalated or intercalated as positive and negative active materials. For an electrolyte, an organic solvent or polymer is used. Rechargeable lithium batteries produce electric energy from changes in the chemical potentials of the active materials during the intercalation and deintercalation reactions of lithium ions.

For the negative active material in a rechargeable lithium battery, metallic lithium was used in the early days of development. Recently, however, carbon material, which intercalate lithium ions reversibly is used extensively instead of the metallic lithium due to problems of high reactivity toward electrolyte and dendrite formation with the metallic lithium. With the use of carbon-based active materials, the potential safety problems which are present in batteries with the metallic lithium can be prevented while achieving higher relative energy density as well as much improved cycle life. In particular, boron is added to carbonaceous materials to produce graphite coated with boron (BOC) in order to increase the capacity of the carbonaceous materials.

For the positive active material in the rechargeable lithium battery, chalcogenide compounds into or from which lithium ions are intercalated or deintercalated are used. Typical examples include $LiCoO_2$, $LiMn_2O_4$, $LiNiO_2$, $LiNi_{1-x}Co_xO_2$ ($0<X<1$) or $LiMnO_2$. Manganese-based materials such as $LiMn_2O_4$ or $LiMnO_2$ are the easiest to prepare, are less expensive than the other materials, and have environmentally friendly characteristics. However, manganese-based materials have a low capacity. $LiCoO_2$ is widely used as it has a good electrical conductivity and high battery voltage and is manufactured by Sony, but it is very expensive. $LiNiO_2$ is inexpensive and has a high charge capacity, but is difficult to produce.

Rechargeable lithium batteries are classified into lithium ion batteries, lithium ion polymer batteries and lithium polymer batteries. The lithium ion battery uses a porous polypropylene/polyethylene film as a separator and a carbonate-based organic solvent dissolved with lithium ions as an electrolyte. The lithium ion polymer battery uses a porous $SiO_2$ substrate or a polymer substrate, such as polyvinylidene fluoride into which a carbonate-based organic solvent is impregnated, as an electrolyte. Because the substrate acts as the electrolyte as well as a separator, the lithium ion polymer battery does not require an additional separator. The lithium polymer battery uses organic materials or inorganic materials such as $SiO_2$, which have lithium ion conductivity.

With regard to the shape or formation of the rechargeable lithium battery, the different variations include a cylindrical type, a prismatic type and a coin type. The cylindrical type rechargeable lithium battery is manufactured by winding positive and a negative electrodes, and a separator into a jelly-roll to prepare an electrode element, inserting the electrode element into a battery case and adding an electrolyte to the case. The prismatic type battery is manufactured by inserting the electrode element into a prismatic case. The coin type battery is manufactured by inserting the electrode element into a coin case.

The battery may be further classified according to the type of case used. That is, there are steel or Al can batteries and pouch batteries. The can battery refers to a battery in which the case is made of a steel or Al thin sheet, and the pouch battery refers to a battery in which the case is made of a flexible material with a thickness of 1 mm or less and having a multi-layered structure such as a vinyl bag. The pouch battery has a smaller thickness and a higher degree of flexibility than the can battery.

With the miniaturization and decrease in weight of products utilizing rechargeable batteries, much research is being performed to develop batteries having good electrochemical performance such as a high capacity and long cycle life characteristics.

SUMMARY OF THE INVENTION

It is an object of the present invention to provide a positive active material for a rechargeable lithium battery exhibiting good electrochemical characteristics such as cycle life, constant current charge capacity, discharge potential, power capacity and high-temperature cycle life.

It is another object to provide a method of preparing the positive active material for a rechargeable lithium battery.

These and other objects may be achieved by utilizing a positive active material for a rechargeable lithium battery including a compound selected from the group consisting of a lithiated compound represented by formulas 1 to 9, a metal oxide layer formed on a surface of the compound and a metal oxide mass adhered to the metal oxide layer.

$$Li_xMn_{1-y}M'_yA_2 \quad (1)$$

$$Li_xMn_{1-y}M'_yO_{2-z}A_z \quad (2)$$

$$Li_xMn_2O_{4-z}A_z \quad (3)$$

$$Li_xMn_{2-y}M'_yA_4 \quad (4)$$

$$Li_xB_{1-y}M''_yA_2 \quad (5)$$

$$Li_xBO_{2-z}A_z \quad (6)$$

$$Li_xNi_{1-y-z}Co_yO_{2-z}A_z \quad (7)$$

$$Li_xNi_{1-y-z}Co_yM''_zA_{2\alpha} \quad (8)$$

$$Li_xNi_{1-y-z}Mn_yM'_zA_\alpha \quad (9)$$

where $0.95 \leqq x \leqq 1.1$, $0 \leqq y \leqq 0.5$, $0 \leqq z \leqq 0.5$; $0 \leqq \alpha \leqq 2$;

M' is at least one element selected from the group consisting of Al, Cr, Co, Ni, Fe, Mg, [Vi] Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr;

M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr;

A is selected from the group consisting of O, F, S and P; and

B is selected from the group consisting of Ni and Co.

In order to achieve these objects and others, the present invention provides a method of preparing a positive active material for a rechargeable lithium battery. In this method, a compound is coated with a metal alkoxide solution and the coated compound is heat-treated. The compound is selected from the group consisting of a lithiated compound represented by formulas 1 to 9. The heat-treated compound is slow-cooled to 100 to 500° C. and the cooled compound is quenched to room temperature.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein:

FIG. 1 is a diagram schematically showing a process by which positive active materials according to the Examples and Comparative examples of the present invention are produced;

FIG. 5b is an enlarged view of a portion of the graph of FIG. 5a.

DETAILED DESCRIPTION OF THE INVENTION

Figure 2:
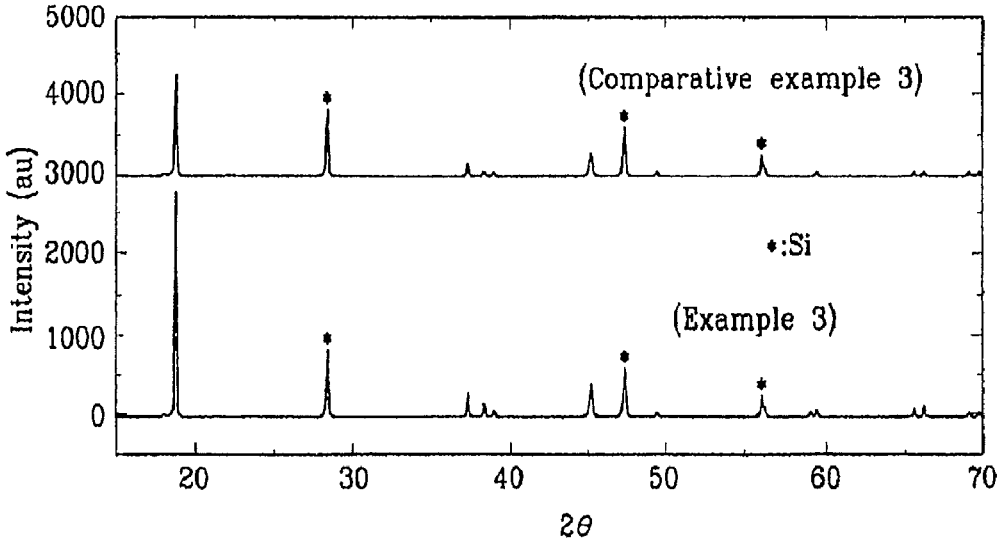
FIG. 2 is a graph illustrating XRD results of positive active materials according to an Example and Comparative example of the present invention.

The present invention discloses a positive active material having a new structure formed by the quenching technique.

The positive active material of the present invention is prepared by coating (encapsulating) a compound with a metal alkoxide solution, an organic solution of a metal salt or an aqueous solution of a metal salt. The compound is at least one lithiated compound represented by formulas 1 to 9.

$$Li_xMn_{1-y}M'_yA_2 \quad (1)$$

$$Li_xMn_{1-y}M'_yO_{2-z}A_z \quad (2)$$

$$Li_xMn_2O_{4-z}A_z \quad (3)$$

$$Li_xMn_{2-y}M'_yA_4 \quad (4)$$

$$Li_xB_{1-y}M''_yA_2 \quad (5)$$

$$Li_xBO_{2-z}A_z \quad (6)$$

$$Li_xNi_{1-y-z}Co_yO_{2-z}A_z \quad (7)$$

$$Li_xNi_{1-y-z}Co_yM''_zA_{2\alpha} \quad (8)$$

$$Li_xNi_{1-y-z}Mn_yM'_zA_\alpha \quad (9)$$

where $0.95 \leqq x \leqq 1.1$, $0 \leqq y \leqq 0.5$, $0 \leqq z \leqq 0.5$; $0 \leqq \alpha \leqq 2$;

M' is at least one element selected from the group consisting of Al, Cr, Co, Ni, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, [Cf.] *Cf*, Es, Fm, Md, No and Lr;

M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr;

A is selected from the group consisting of O, F, S and P; and

B is selected from the group consisting of Ni and Co.

The coating process may be performed by a sputtering method, a chemical vapor deposition (CVD) method, an impregnation method such as dip coating, or by using any other general-purpose coating technique. Any other coating techniques, if available and applicable, may be as effective as the methods described herein. A common method for performing the coating process is dipping the powder compound in the solution.

The metal in the metal alkoxide solution, the organic solution of metal salt, or an aqueous solution of metal salt may be any metal that is capable of dissolving in alcohol, organic solvents or water. One example of such a metal may be Mg, Al, Co, K, Na, Ca, Si, Ti, V, Sn, Ge, Ga, B or As. A preferable metal is Al.

The metallic alkoxide solution is prepared by the reaction of an alcohol with a metal of 0.1 to 20% by weight and preferably 0.1 to 10% by weight of the alcohol. Alternatively, the metal alkoxide is prepared by dissolving metal alkoxide. The alcohol may be methanol or ethanol and the metal alkoxide may be metal methoxide, metal ethoxide, or metal propoxide. The organic solution of metal salt is prepared by mixing an organic solvent with a metal salt of 0.1 to 20% by weight, preferably 0.1 to 10% by weight of the organic solvent. A useful organic solvent is hexane, chloroform, tetrahydrofuran, ether, methylene chloride or acetone. The metal aqueous solution is prepared by mixing water with a metal or metal oxide of 0.1 to to 20% by weight, preferably 0.1 to 10% by weight of water.

One exemplary embodiment of the metal alkoxide solution is tetraorthosilicate purchased from Aldrich, Co., or tetraethylorthosilicate obtained from a mixture of silicate and ethanol. An exemplary embodiment of the metal aqueous solution is vanadium oxide or ammonium vanadate.

When the metal is less than 0.1% by weight of alcohol, organic solvent or water, the effect obtained by coating the solution onto the powder is not evident. In contrast, when the metal is more than 20% by weight of water or alcohol, the resultant coating layer becomes undesirably thick.

The coated powder is dried at 120° C. for 5 hours in an oven. The drying step is performed to uniformly distribute the lithium salt in the powder.

Thereafter, the dried powder is heat-treated at 200 to 1000° C. for 1 to 20 hours. If the heat-treating temperature is lower than 200° C., the metallic alkoxide solution or the metallic aqueous solution coated on the powder is not crystallized and the free movement of lithium ions through the active material is restricted. Whereas, if the heat-treating temperature is higher than 1000° C., lithium is actively evaporated and the crystallinity of the metal oxide layer formed on the surface is increased to such an extent that the movement of lithium ions is interrupted. In addition, when the heat-treating step is performed for more than 20 hours, identical problems are encountered (i.e. the evaporation of lithium and an increase in the crystallinity of the metal oxide layer formed on the surface thereby interrupting the movement of lithium ions).

As a result of the heat-treating step, the metallic alkoxide solution or metal aqueous solution is converted into metal oxide. In this way, a metal oxide-coated active material is prepared. The metal oxide formed on the surface of the powder may be derived from a single source of metallic alkoxide solution or metal aqueous solution, or from composite sources of cobalt, nickel, nickel-manganese or manganese salt and metallic alkoxide solution or metal aqueous solution. For example, $LiCoO_2$ can be coated with aluminum alkoxide sol and then this alkoxide-coated $LiCoO_2$ is heat-treated to produce a positive active material coated with a composite metal oxide of cobalt and aluminum (Co—Al—O) and/or aluminum oxide ($Al_2O_3$). The heating step is preferably performed under dry air or oxygen to obtain a uniformly crystalline active material.

It is preferable that the thickness of the metal oxide is 1 to 100 nm. If the thickness of the metal oxide layer is less than 1 nm, the effect obtained by coating metal oxide onto the powder is not realized. In contrast, if the thickness of the metal oxide layer is more than 100 nm, the coating layer becomes undesirably thick.

The heat-treated material is slow-cooled to 100 to 500° C., and preferably 200 to 400° C. The slow-cooling step is generally performed in a furnace. Next, the slow-cooled material is quenched to room temperature. The quenching step is performed by rapidly transferring the material from high temperature region (the furnace) to room temperature region (outside of the furnace). The quenching rate is preferably more than or equal to 0.5° C./min. As a result of the quenching step, the metal is extracted from the metal oxide layer on the surface of the active material and adhered in the form of metal *oxide* masses to the surface of the metal oxide layer. As a result, an uneven surface is formed on the surface of the metal oxide layer.

The process described above is shown in FIG. 1. As shown in FIG. 1, when the quenching step is performed, metal oxide masses, for example $Al_2O_3$ masses, are adhered to the metal oxide layer. However, when the slow-cooling step is performed, no $Al_2O_3$ masses are adhered to the metal oxide layer and a material with a uniform surface is obtained.

Owing to the metal oxide masses, the volume of the active material increases. Accordingly, the active material has a surface structure into or from which lithium ions are easily intercalated or deintercalated. In addition, the electrolyte is easily immersed into the active material owing to the metal oxide masses such that the chemical reactions in the battery uniformly occur and the efficiency of the battery increases.

The compound represented by formulas 1 to 9 may be available commercially or may be produced by the following procedure.

Lithium salts are mixed with metal salts in a desirable ratio. The lithium salt may be any material known in the related art and exemplary embodiments thereof are lithium nitrate, lithium acetate and lithium hydroxide. For the metal salts; manganese salts, cobalt salts, nickel salts or nickel-cobalt salts may be used. Typical examples of the manganese salts are manganese acetate and manganese dioxide. Typical examples of the cobalt salts are cobalt hydroxide, cobalt nitrate and cobalt carbonate, and of the nickel salts are nickel hydroxide, nickel nitrate and nickel acetate. The nickel-manganese salts are produced by co-precipitating nickel and manganese salts. Fluoride salts, sulfur salts or phosphorous salts may be further used together with the manganese salts, cobalt salts, nickel salts or nickel-cobalt salts. The fluoride salts may be manganese fluoride or lithium fluoride and the sulfur salts may be manganese sulfide or lithium sulfide. The phosphorous salts may be $H_3PO_4$. The manganese, cobalt, nickel, nickel-manganese, fluoride, sulfur and phosphorus salts are not limited to the above compounds.

At this time, in order to facilitate the reaction of the lithium salts and the metal salts, a solvent is added to the mixture. The solvent may be ethanol, methanol, water or acetone. The mixture is then mortar grinder mixed until a solvent-free condition is reached.

The resulting mixture is heat-treated (first heat-treating step) at 400 to 600° C. to produce a semi-crystalline positive active material precursor powder. If the first heat-treating step temperature is less than 400° C., the metal salts do not completely react with the lithium salts. Thereafter, the heat-treated active material precursor powder is dried under dry air or oxygen, and the precursor powder is remixed to uniformly distribute the lithium salts. Alternatively, the remixing step may be performed immediately after the heat-treating step.

The semi-crystalline precursor powder is again heat-treated (second heat-treating step) at 700 to 900° C. for about 10 to 15 hours to produce a crystalline positive active material. As described above, if the first heat-treating step temperature is less than 400° C., the lithium salts do not completely react with the metal salts. If the second heat-treating step temperature is less than 700° C., it is difficult to form a crystalline material. The heating step is performed by increasing the temperature at a rate of 1 to 5° C./min under dry air. The mixture is allowed to stand at the first and second heat-treating temperature for predetermined times and the mixture is naturally cooled. As a result, a powder of a compound selected from the group consisting of the compounds represented by formulas 1 to 9 is obtained.

Thereafter, the compounds represented by formulas 1 to 9 are remixed at room temperature to uniformly distribute the lithium salts.

The resulting positive active material includes a core, a metal oxide layer formed around the core, and metal oxide masses adhered to the metal oxide layer. The core includes at least one compound represented by formulas 1 to 9. The surface of the positive active material is rough and uneven. The metal oxide layer on the surface of the positive active material of the present invention improves the structural stability of the active material during charge and discharge operations. The metal oxide masses act to expand the volume of the active material such that a surface structure into or from which lithium ions are intercalated or deintercalated is obtained, resulting in an increase in the discharge potential. Furthermore, the metal oxide masses help to enable easy immersion of the electrolyte into the active material such that the battery reaction uniformly occurs and efficiency increases.

The following examples further illustrate the present invention.

Example 1

$LiCoO_2$ (manufactured by Nippon Chem Co., Japan, under C-10) was coated with a 5% Al-isopropoxide ethanol solution (95 wt % of ethanol/ 5 wt % of Al-isopropoxide powder). The coated $LiCoO_2$ was heat-treated at 300° C. for 10 hours to prepare a core-shell type $LiCoO_2$ having a $Al_2O_3$ and Co—Al—O surface.

The resulting $LiCoO_2$ was slow-cooled to 200° C. in a furnace and the slow-cooled $LiCoO_2$ was quenched to room temperature at a quenching rate of 0.5° C./min, thereby producing a positive active material for a rechargeable lithium battery.

Example 2

$LiCoO_2$ (manufactured by Nippon Chem Co., Japan, under C-10) was coated with a 5% Al-isopropoxide ethanol solution (95 wt % of ethanol/ 5 wt % of Al-isopropoxide powder). The coated $LiCoO_2$ was heat-treated at 500° C. for 10 hours to prepare a core-shell type $LiCoO_2$ having a $Al_2O_3$ and Co—Al—O surface.

The resulting $LiCoO_2$ was slow-cooled to 250° C. in a furnace and the slow-cooled $LiCoO_2$ was quenched to room temperature at a quenching rate of 3° C./min, thereby producing a positive active material for a rechargeable lithium battery.

Example 3

$LiCoO_2$ (manufactured by Nippon Chem Co., Japan, under C-10) was coated with a 5% Al-isopropoxide ethanol solution (95 wt % of ethanol/ 5 wt % of Al-isopropoxide powder). The coated $LiCoO_2$ was heat-treated at 700° C. for 10 hours to prepare a core-shell type $LiCoO_2$ having a $Al_2O_3$ and Co—Al—O surface.

The resulting $LiCoO_2$ was slow-cooled to 300° C. in a furnace and the slow-cooled $LiCoO_2$ was quenched to room temperature at a quenching rate of 5° C./min, thereby producing a positive active material for a rechargeable lithium battery.

Comparative Example 1

$LiCoO_2$ (manufactured by Nippon Chem Co., Japan, under C-10) was coated with a 5% Al-isopropoxide ethanol solution (95 wt % of ethanol/ 5wt % of Al-isopropoxide powder). The coated $LiCoO_2$ was heat-treated at 300° C. for 10 hours to prepare a $LiCoO_2$ having a $Al_2O_3$ surface.

The resulting $LiCoO_2$ was slow-cooled to a temperature of less than 100° C. in a furnace at a quenching rate of 0.05° C./min, thereby producing a positive active material for a rechargeable lithium battery.

Comparative Example 2

$LiCoO_2$ (manufactured by Nippon Chem Co., Japan, under C-10) was coated with a 5% Al-isopropoxide ethanol solution (95 wt % of ethanol/ 5 wt % of Al-isopropoxide powder). The coated $LiCoO_2$ was heat-treated at 500° C. for 10 hours to prepare a core and shell-type $LiCoO_2$ having a $Al_2O_3$ surface The resulting $LiCoO_2$ was slow-cooled to a temperature of less than 100° C. at a quenching rate of 0.05° C./min in a furnace, thereby producing a positive active material for a rechargeable lithium battery.

Comparative Example 3

$LiCoO_2$ (manufactured by Nippon Chem Co., Japan, under C-10) was coated with a 5% Al-isopropoxide ethanol solution (95 wt % of ethanol/ 5 wt % of Al-isopropoxide powder). The coated $LiCoO_2$ was heat-treated at 700° C. for 10 hours to prepare a core and shell-type $LiCoO_2$ having a Co—Al—O surface The resulting $LiCoO_2$ was slow-cooled to 100° C. or less in a furnace at a quenching rate of 0.05° C./min, thereby producing a positive active material for a rechargeable lithium battery.

The XRD results of the positive active materials according to Example 3 and Comparative example 3 are presented in FIG. 2. As shown in FIG. 2, the positive active material according to Example 3 has a structure similar to the positive active material according to Comparative example 3. This result indicates that the quenching step does not affect the lattice structure of the active materials.

Figure 3A:
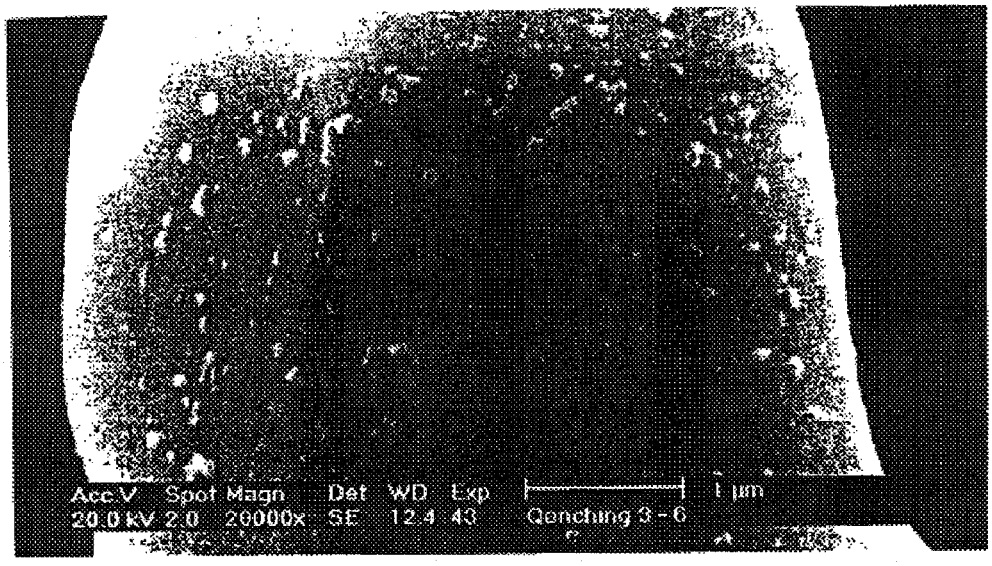
FIG. 3a is an SEM photograph of a positive active material according to an Example of the present invention.
Figure 3B:
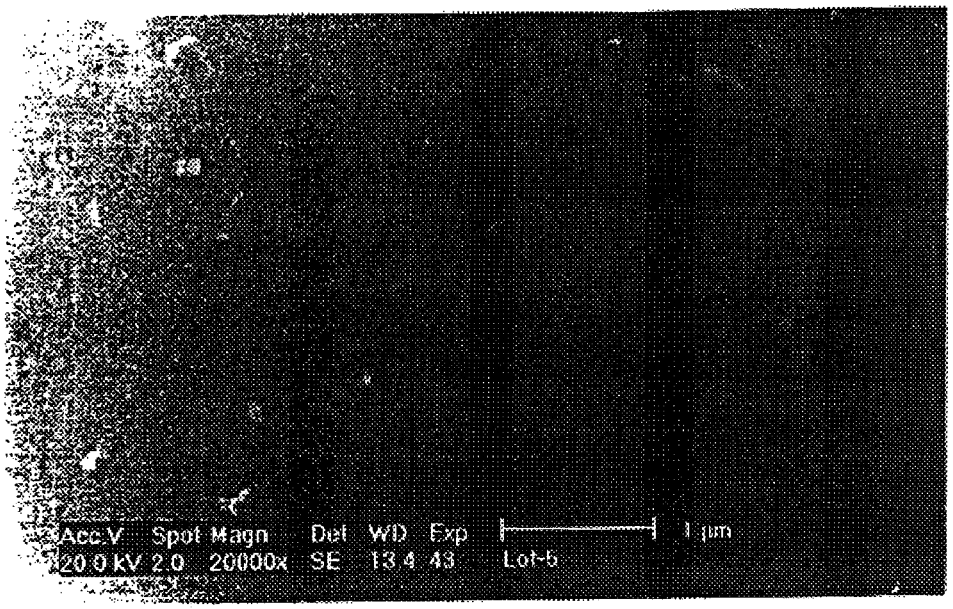
FIG. 3b is an SEM photograph of a positive active material according to a Comparative example of the present invention.

SEM photographs of the positive active materials according to Example 3 and Comparative example 3 are presented in FIGS. 3a and 3b, respectively. It is evident from FIGS. 3a and 3b that the $Al_2O_3$ masses are adhered to a surface of the positive active material according to Example 3 and the resulting positive active material has an uneven surface, whereas the positive active material according to Comparative example 3 has a uniform surface on which no $Al_2O_3$ particles are present.

Figure 4A:
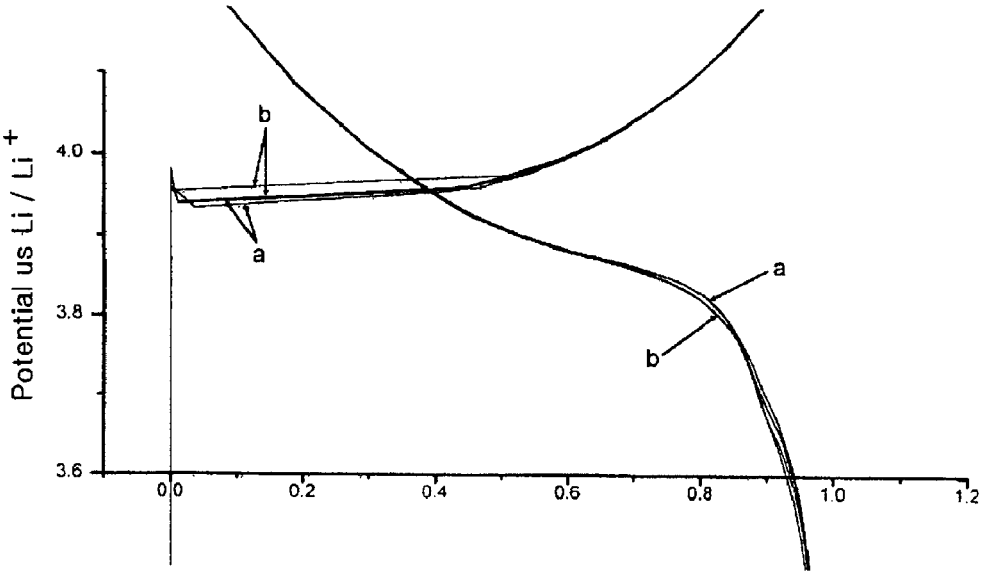
FIG. 4a is a graph illustrating low-rate characteristics of coin cells using positive active materials according to an Example and Comparative example of the present invention.
Figure 4B:
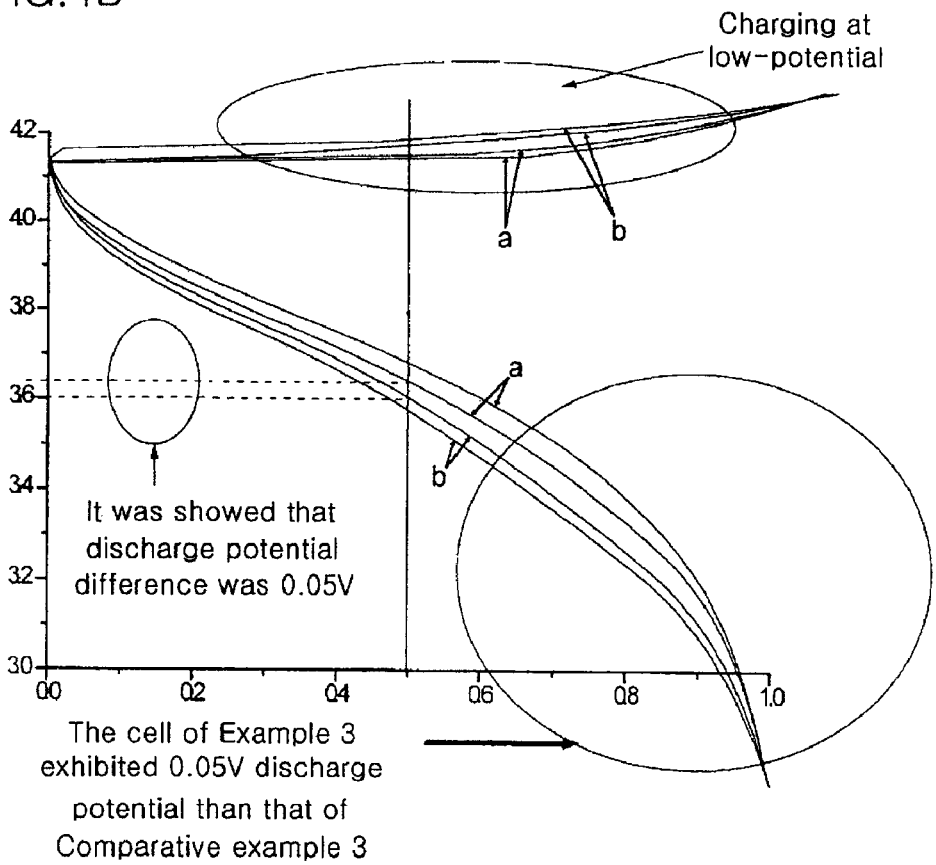
FIG. 4b is a graph illustrating high-rate characteristics of coin cells using positive active materials according to an Example and Comparative example of the present invention.

Coin-type half cells were manufactured using the positive active materials according to Example 3 and Comparative example 3, and metallic lithium as a reference electrode. In these cells, 1M $LiPF_6$ dissolved in a solvent of ethylene carbonate and dimethylene carbonate (1:1 volume ratio) was used as an electrolyte. The half-cells were charged and discharged at 0.2C and the results are presented in FIG. 4a. In addition, the half-cells were charged and discharged at 1C and the results are shown in FIG. 4b. As shown in FIG. 4a, the cell according to Example 3 (a) exhibited a higher discharge potential than the cell according to Comparative example 3 (b). Also, as shown in FIG. 4b, the discharge potentials of Example 3 and Comparative example 3 differed greatly as the charge and discharge rate increases. Namely, the cell according to Example 3 exhibited a 0.05V higher discharge potential than the cell according to Comparative example 3. Such an outcome is viewed to be the result of the uneven surface of the positive active material according to Example 3 into or from which lithium ions are easily intercalated or deintercalated.

Figure 5A:
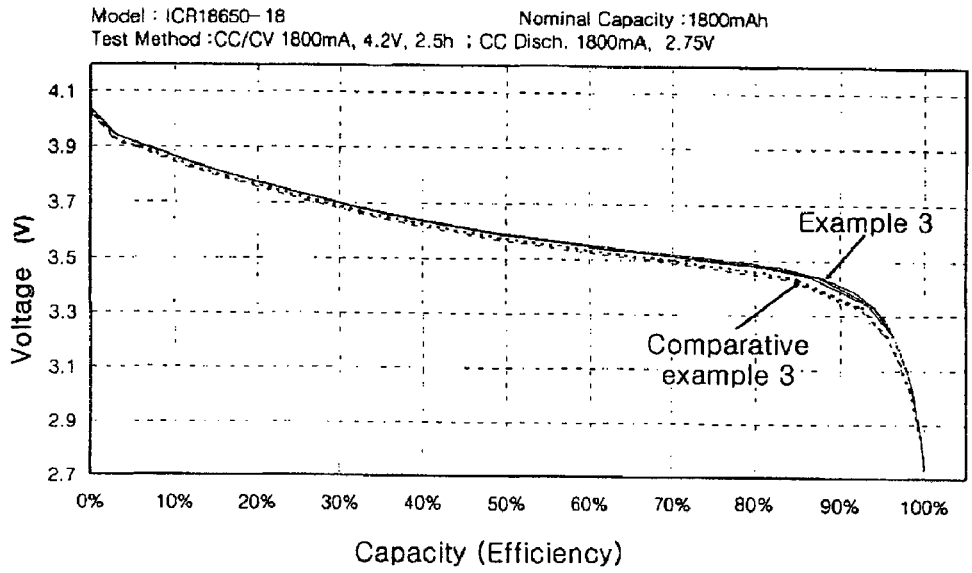
FIG. 5a is a graph illustrating a discharge capacity of cylindrical cells using positive active materials according to an Example and Comparative example of the present invention.
Figure 5B:
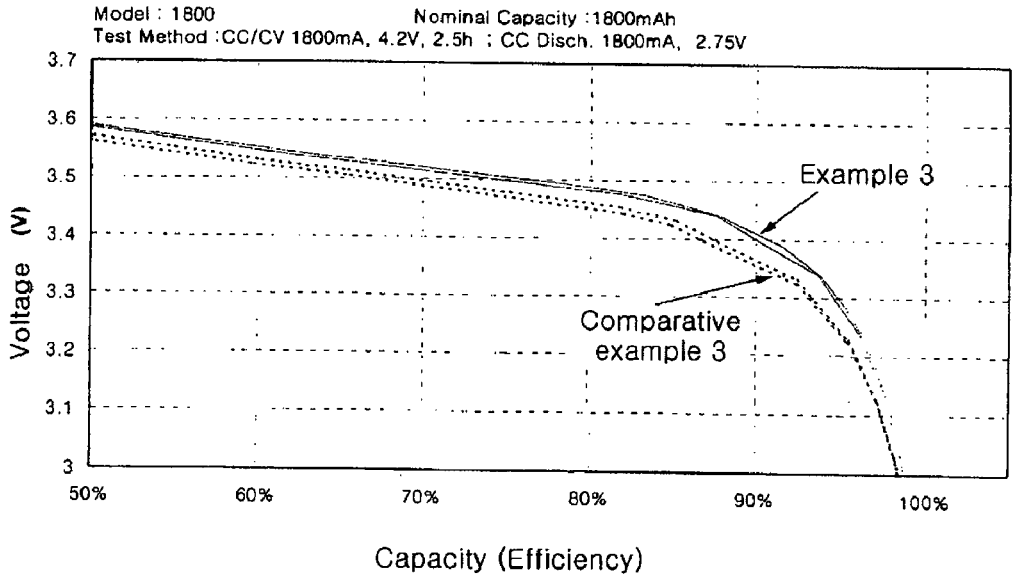

18650 type full-cells were manufactured using the positive active materials according to Example 3 and Comparative example 3. For the negative electrodes, graphite-based carbonaceous materials were used and for electrolytes, 1M $LiPF_6$ dissolved in a solvent of ethylene carbonate and dimethylene carbonate (1:1 volume ratio) was used. The discharge potential of the full-cells were measured and the results are presented in FIG. 5a. For easy comparison between two full-cells an enlarged view is shown in FIG. 5b. In FIGS. 5a and 5b, the x-axis indicates values based on a maximum capacity (100%) of Example 3 and Comparative example 3. As shown in FIGS. 5a and 5b, the cell according to Example 3 exhibited a better discharge potential than the cell according to Comparative example 3.

The XRD and SEM of cells using the active material of Examples 1 and 2, and discharge potentials of half-cells and full-cells according to Examples 1 and 2 were similar to Example 3.

Example 4

A positive active material for a rechargeable lithium battery was prepared by the same procedure as used in Example 1 except that $LiMn_2O_4$ (manufactured by Nikki Co., Japan, under LM4) was used instead of $LiCoO_2$.

Example 5

A positive active material for a rechargeable lithium battery was prepared by the same procedure as used in Example 2 except that $LiMn_2O_4$ (manufactured by Nikki Co., Japan, under LM4) was used instead of $LiCoO_2$.

Example 6

A positive active material for a rechargeable lithium battery was prepared by the same procedure as used in Example 3 except that $LiMn_2O_4$ (manufactured by Nikki Co., Japan, under LM4) was used instead of $LiCoO_2$.

Example 7

A positive active material for a rechargeable lithium battery was prepared by the same procedure as used in Example 1 except that $LiNi_{0.9}Co_{0.1}Sr_{0.002}O_2$ (manufactured by Honjo Co., Japan) was used instead of $LiCoO_2$.

Example 8

A positive active material for a rechargeable lithium battery was prepared by the same procedure as used in Example 2 except that $LiNi_{0.9}Co_{0.1}Sr_{0.002}O_2$ (manufactured by Honjo Co., Japan) was used instead of $LiCoO_2$.

Example 9

A positive active material for a rechargeable lithium battery was prepared by the same procedure as used in Example 3 except that $LiNi_{0.9}Co_{0.1}Sr_{0.002}O_2$ (manufactured by Honjo Co., Japan) was used instead of $LiCoO_2$.

The positive active material for a rechargeable lithium battery as described herein exhibits good discharge potential such that when the positive active material is used in a battery, a high voltage level is obtained.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a rechargeable lithium battery comprising:

at least one compound selected from the group consisting of lithiated compounds represented by formulas 1 to 9;

$$Li_xMn_{1-y}M'_yA_2 \quad (1)$$

$$Li_xMn_{1-y}M'_yO_{2-z}A_z \quad (2)$$

$$Li_xMn_2O_{4-z}A_z \quad (3)$$

$$Li_xMn_{2-y}M'_yA_4 \quad (4)$$

$$Li_xB_{1-y}M''_yA_2 \quad (5)$$

$$Li_xBO_{2-z}A_z \quad (6)$$

$$Li_xNi_{1-y-z}Co_yO_{2-z}A_z \quad (7)$$

$$Li_xNi_{1-y-z}Co_yM''_zA_{2\alpha} \quad (8)$$

$$Li_xNi_{1-y-z}Mn_yM'_zA_\alpha \quad (9)$$

where $0.95 \leqq x \leqq 1.1$, $0 \leqq y \leqq 0.5$, $0 \leqq z \leqq 0.5$; $0 \leqq \alpha \leqq 2$;

M' is at least one element selected from the group consisting of Al, Cr, Co, Ni, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, [Cf.] *Cf,* Es, Fm, Md, No and Lr;

M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr;

A is selected from the group consisting of O, F, S and P; and

B is selected from the group consisting of Ni and Co;

a metal oxide layer formed on a surface of the compound; and a plurality of metal oxide masses adhered on the metal oxide layer.

2. The positive active material for a rechargeable lithium battery of claim 1 wherein the metal of the metal oxide layer and metal oxide masses is selected from the group consisting of Mg, Al, Co, K, Na, Ca, Si, Ti, V, Ga, Ge, Sn, B and As.

3. The positive active material for a rechargeable lithium battery of claim 1 wherein a thickness of the metal oxide layer is 1 to 100 nm.

4. A method of preparing a positive active material for a rechargeable lithium battery according to claim 1, comprising the steps of:

coating at least one compound with a metal alkoxide solution, an organic solution of a metal salt or an aqueous solution of a metal salt, the compound being selected from the group consisting of lithiated compounds represented by formulas 1 to 9;

$$Li_xMn_{1-y}M'_yA_2 \quad (1)$$

$$Li_xMn_{1-y}M'_yO_{2-z}A_z \quad (2)$$

$$Li_xMn_2O_{4-z}A_z \quad (3)$$

$$Li_xMn_{2-y}M'_yA_4 \quad (4)$$

$$Li_xB_{1-y}M''_yA_2 \quad (5)$$

$$Li_xBO_{2-z}A_z \quad (6)$$

$$Li_xNi_{1-y-z}Co_yO_{2-z}A_z \quad (7)$$

$$Li_xNi_{1-y-z}Co_yM''_zA_{2\alpha} \quad (8)$$

$$Li_xNi_{1-y-z}Mn_yM'_zA_\alpha \quad (9)$$

where $0.95 \leqq x \leqq 1.1$, $0 \leqq y \leqq 0.5$, $0 \leqq z \leqq 0.5$; $0 \leqq \alpha \leqq 2$;

M' is at least one element selected from the group consisting of Al, Cr, Co, Ni, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, [Cf.] *Cf,* Es, Fm, Md, No and Lr;

M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr;

A is selected from the group consisting of O, F, S and P; and

B is selected from the group consisting of Ni and Co;

[heat-retreat] *heat-treating* the coated-compound;

slow-cooling the heat-treated compound to 100 to 500° C; and quenching the cooled compound to room temperature.

5. The method of claim 4 wherein the compound is coated with a metal alkoxide solution containing a metal selected from the group consisting of Mg, Al, Co, K, Na, Ca, Si, Ti, V, Ga, Ge, Sn, B and As.

6. The method of claim 4 wherein the metal alkoxide solution and the metal aqueous solution have a concentration of 1 to 20%.

7. The method of claim 4 wherein the heat-treating step is performed at 200 to 1000° C. for 1 to 20 hours.

8. The method of claim 4 wherein the quenching step is performed at a quenching rate of more than or equal to 0.5° C./min.

9. A positive active material for a rechargeable lithium battery comprising:

at least one compound selected from the group consisting of lithiated compounds represented by formulas 1 to 9;

$$Li_xMn_{1-y}M'_yA_2 \quad (1)$$

$$Li_xMn_{1-y}M'_yO_{2-z}A_z \quad (2)$$

$$Li_xMn_2O_{4-z}A_z \quad (3)$$

$$Li_xMn_{2-y}M'_yA_4 \quad (4)$$

$$Li_xB_{1-y}M''_yA_2 \quad (5)$$

$$Li_xBO_{2-z}A_z \quad (6)$$

$$Li_xNi_{1-y-z}Co_yO_{2-z}A_z \quad (7)$$

$$Li_xNi_{1-y-z}Co_yM''_zA_{2\alpha} \quad (8)$$

$$Li_xNi_{1-y-z}Mn_yM'_zA_\alpha \quad (9)$$

where $0.95 \leqq x \leqq 1.1$, $0 \leqq y \leqq 0.5$, $0 \leqq z \leqq 0.5$; $0 \leqq \alpha \leqq 2$;

M' is Ni;

M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr;

A is selected from the group consisting of O, F, S and P; and

B is selected from the group consisting of Ni and Co;

a metal oxide layer formed on a surface of the compound; and a plurality of metal oxide masses adhered on the metal oxide layer.

10. The positive active material for a rechargeable lithium battery of claim 9 wherein the metal of the metal oxide layer and metal oxide masses is selected from the group consisting of Mg, Al, Co, K, Na, Ca, Si, Ti, V, Ga, Ge, Sn, B and As.

11. The positive active material for a rechargeable lithium battery of claim 9 wherein a thickness of the metal oxide layer is 1 to 100 nm.

12. A method of preparing a positive active material for a rechargeable lithium battery according to claim 9, comprising the steps of:

coating at least one compound with a metal alkoxide solution, an organic solution of a metal salt or an aqueous solution of a metal salt, the compound being selected from the group consisting of lithiated compounds represented by formulas 1 to 9;

$$Li_xMn_{1-y}M'_yA_2 \quad (1)$$

$$Li_xMn_{1-y}M'_yO_{2-z}A_z \quad (2)$$

$$Li_xMn_2O_{4-z}A_z \quad (3)$$

$$Li_xMn_{2-y}M'_yA_4 \quad (4)$$

$$Li_xB_{1-y}M''_yA_2 \quad (5)$$

$$Li_xBO_{2-z}A_z \quad (6)$$

$$Li_xNi_{1-y-z}Co_yO_{2-z}A_z \quad (7)$$

$$Li_xNi_{1-y-z}Co_yM''_zA_{2\alpha} \quad (8)$$

$$Li_xNi_{1-y-z}Mn_yM'_zA_\alpha \quad (9)$$

where $0.95 \leqq x \leqq 1.1$, $0 \leqq y \leqq 0.5$, $0 \leqq z \leqq 0.5$; $0 \leqq \alpha \leqq 2$;

M' is Ni;

M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr;

A is selected from the group consisting of O, F, S and P; and

B is selected from the group consisting of Ni and Co;

heat-treating the coated compound;

slow-cooling the heat-treated compound to 100 to 500° C.; and quenching the cooled compound to room temperature.

13. The method of claim 12 wherein the compound is coated with a metal alkoxide solution containing a metal selected from the group consisting of Mg, Al, Co, K, Na, Ca, Si, Ti, V, Ga, Ge, Sn, B and As.

14. The method of claim 12 wherein the metal alkoxide solution and the metal aqueous solution have a concentration of 1 to 20%.

15. The method of claim 12 wherein the heat-treating step is performed at 200 to 1000° C. for 1 to 20 hours.

16. The method of claim 12 wherein the quenching step is performed at a quenching rate of more than or equal to 0.5° C./min.

* * * * *